United States Patent [19]

Laverman

[11] Patent Number: 4,524,756
[45] Date of Patent: Jun. 25, 1985

[54] THERMAL ENERGY STORAGE TANK USING MODULAR HEAT BATTERIES

[75] Inventor: Royce J. Laverman, South Holland, Ill.

[73] Assignee: Chicago Bridge & Iron Company, Oak Brook, Ill.

[21] Appl. No.: 516,593

[22] Filed: Jul. 25, 1983

[51] Int. Cl.³ .................. F24H 7/00; F28D 17/00
[52] U.S. Cl. ................................. 126/400; 165/10
[58] Field of Search ............... 126/400, 430, 427, 436; 165/10 R, 10 A, 10 B

[56] References Cited

U.S. PATENT DOCUMENTS

| | | | |
|---|---|---|---|
| 4,124,061 | 11/1978 | Mitchell et al. | |
| 4,139,321 | 2/1979 | Werner | 126/400 |
| 4,200,148 | 4/1980 | Friefeld et al. | |
| 4,222,365 | 9/1980 | Thomson | |
| 4,233,960 | 11/1980 | Johnson | 126/430 |
| 4,286,574 | 9/1981 | Vrolyk | 126/436 |
| 4,362,149 | 12/1982 | Thomson | |

OTHER PUBLICATIONS

A paper by J. M. Friefeld et al, entitled "Design and Construction of the 'Solar One' Thermal Storage Subsystem" pp. 1468-1473, published by IEEE in 1982.

Primary Examiner—William E. Lyddane
Assistant Examiner—Gerald Anderson
Attorney, Agent, or Firm—Marshall, O'Toole, Gerstein, Murray & Bicknell

[57] ABSTRACT

A thermal energy storage apparatus comprising a thermally insulated tank having a bottom, side wall and roof; a plurality of spaced apart modular heat batteries inside the tank supported on load bearing thermal insulation on the tank bottom; each heat battery constituting an enclosed metal shell containing a bed of solid objects and around which objects a liquid can flow; a conduit to feed a hot or cold liquid from outside of the tank to the top of each bed in each battery; and a conduit to withdraw a hot or cold liquid from the bottom of each bed in each battery and deliver it to a destination outside of the tank.

4 Claims, 4 Drawing Figures

THERMAL ENERGY STORAGE TANK USING MODULAR HEAT BATTERIES

This invention relates to the storage and extraction of thermal energy. More particularly, this invention is concerned with a thermal energy storage apparatus which employs a plurality of heat batteries of modular design located in an insulated tank.

BACKGROUND OF THE INVENTION

With the recent interest in energy conservation and efficiency, and with the development of solar energy technology, there has been considerable interest in the application of thermal energy storage. Many applications, both industrial and commercial, have been evaluated for possible use of thermal energy storage concepts. The temperature range over which it is desired to store thermal energy varies considerably with these different concepts, and range from approximately 200° F. to temperatures in excess of 1000° F.

Many of the energy storage systems already proposed employ a tape of tank to contain the heated material. However, major design problem are involved with such tanks because of the thermal movements associated with placing the storage tank in service and with the normal temperature cycles through which it operates. These temperature variations cause considerable difficulty in the load bearing insulation and foundation of the storage tank. A need accordingly exists for improved thermal energy storage apparatus.

SUMMARY OF THE INVENTION

According to a first aspect of the invention there is provided a thermal energy storage apparatus comprising a thermally insulated tank having a bottom, side wall and roof; a plurality of spaced apart modular heat batteries inside the tank supported on load bearing thermal insulation on the tank bottom; each heat battery constituting an enclosed metal shell containing a bed of solid objects and around which objects a liquid can flow; conduit means to feed a hot or cold liquid from outside of the tank to the top of each bed in each battery; and conduit means to withdraw a hot or cold liquid from the bottom of each bed in each battery and deliver it to a destination outside of the tank.

Each heat battery can be a vertical circular cylindrical shell with a flat bottom. Furthermore, the solid objects in each battery can be rocks.

The tank desirably has a flat bottom and a vertical circular cylindrical side wall which supports the roof.

The side wall thermal insulation can comprise a layer of granular insulation supported between the side wall and a thin gauge metal barrier which is suspended from the side wall by a plurality of horizontal rods; and the bottom insulation can comprise concrete load bearing insulation, such as in the form of blocks.

The roof thermal insulation can be provided by a layer of granular insulation supported by a metal deck suspended by rods from the roof.

The apparatus can also include means to flood the tank with an inert gas for safety purposes. For the same reason, means can be included to supply each battery with a blanket of an inert gas.

Each battery bottom is desirably provided with means which maintains it axially stationary while permitting radial expansion and contraction with temperature change. Each battery is preferably supported on load bearing thermal insulation.

According to a second aspect of the invention there is provided a method of storing thermal energy comprising distributing a flowing hot liquid to the top of a plurality of heat storage batteries containing a bed of cold solid objects; allowing the hot liquid to flow downwardly in a trickle flow manner over the bed of solid objects contained in the heat storage batteries; allowing a vertical temperature gradient, including a downwardly moving thermocline heat transfer zone, with the flowing hot liquid above the zone and the flowing cold liquid below the zone, to develop; and removing the cold liquid from below the thermocline heat transfer zone from the bottom of the heat storage batteries.

According to a third aspect of the invention there is provided a method of recovering stored thermal energy comprising distributing a flowing cold liquid to the top of a plurality of heat storage batteries containing a bed of hot solid objects; allowing the cold liquid to flow downwardly in a trickle flow manner over the bed of solid objects contained in the heat storage batteries; allowing a vertical temperature gradient, including a downwardly moving thermocline heat transfer zone in which the cold liquid is located above the zone and hot liquid is located below the zone, to develop in the heat storage batteries; and removing the hot liquid from below the thermocline heat transfer zone from the bottom of the heat storage batteries.

DETAILED DESCRIPTION OF THE DRAWINGS

Figure 1:
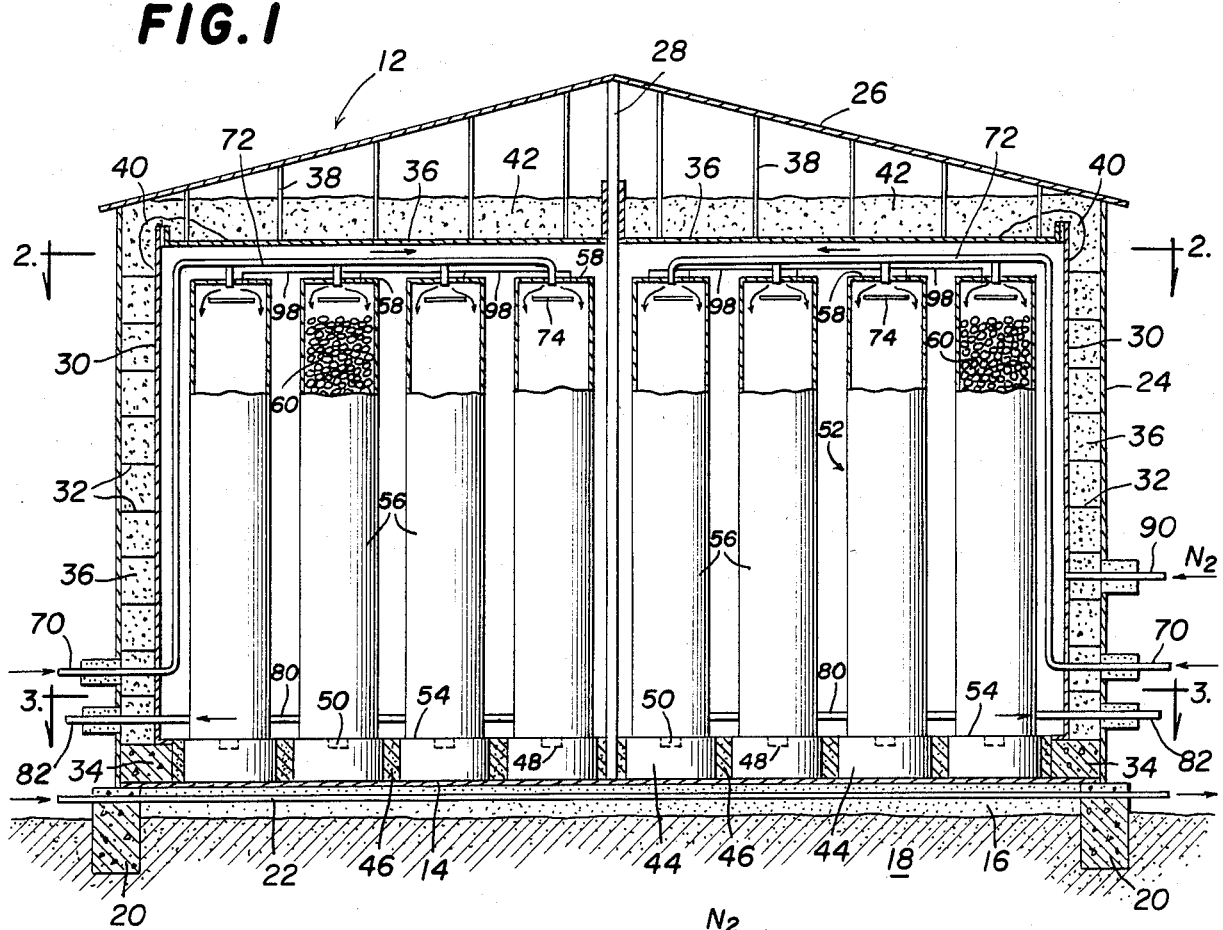
FIG. 1 illustrates a thermal energy storage apparatus, according to the invention, having a tank shown in vertical section and heat batteries therein shown in elevation and partially broken away.
Figure 2:
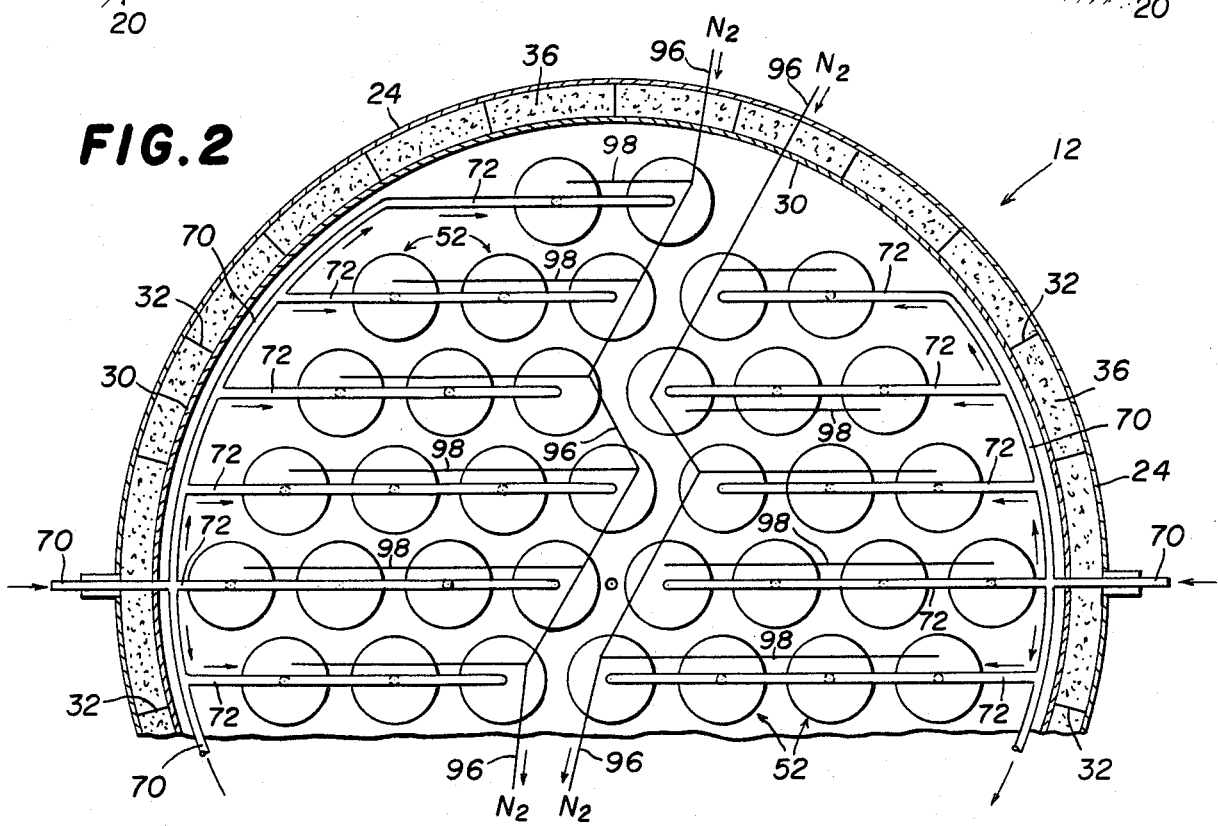
FIG. 2 is a partial sectional view taken along the line 2—2 of FIG. 1.
Figure 3:
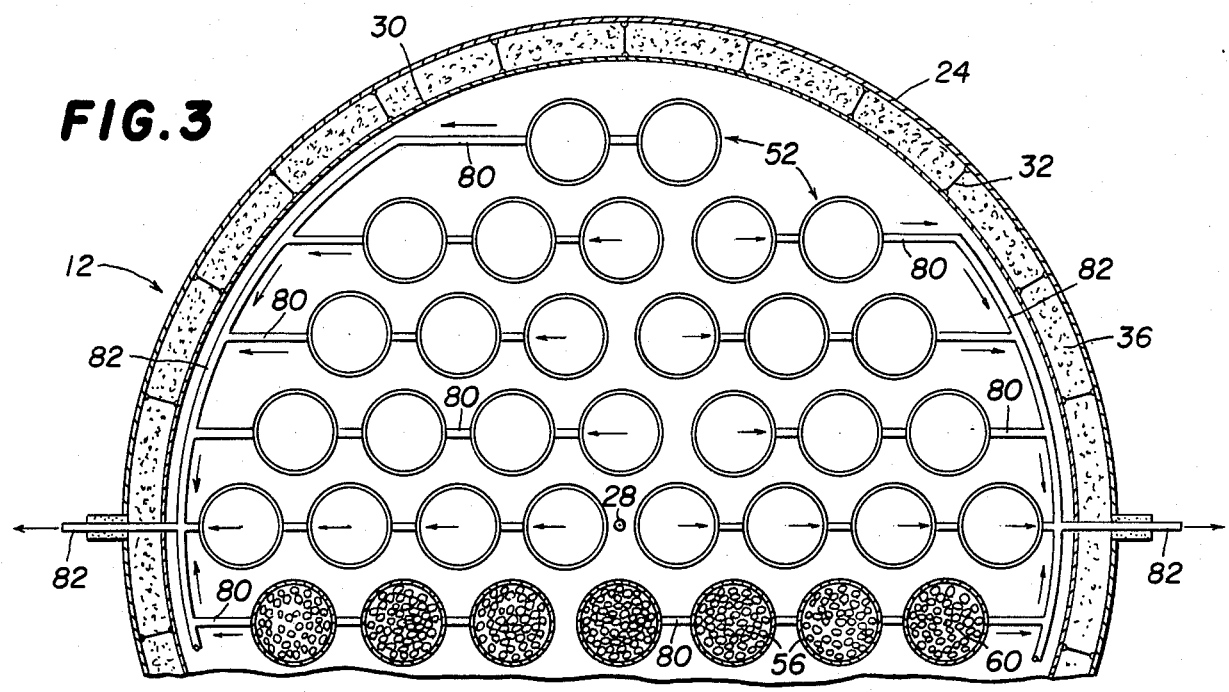
FIG. 3 is a partial sectional view taken along the line 3—3 of FIG. 1.
Figure 4:
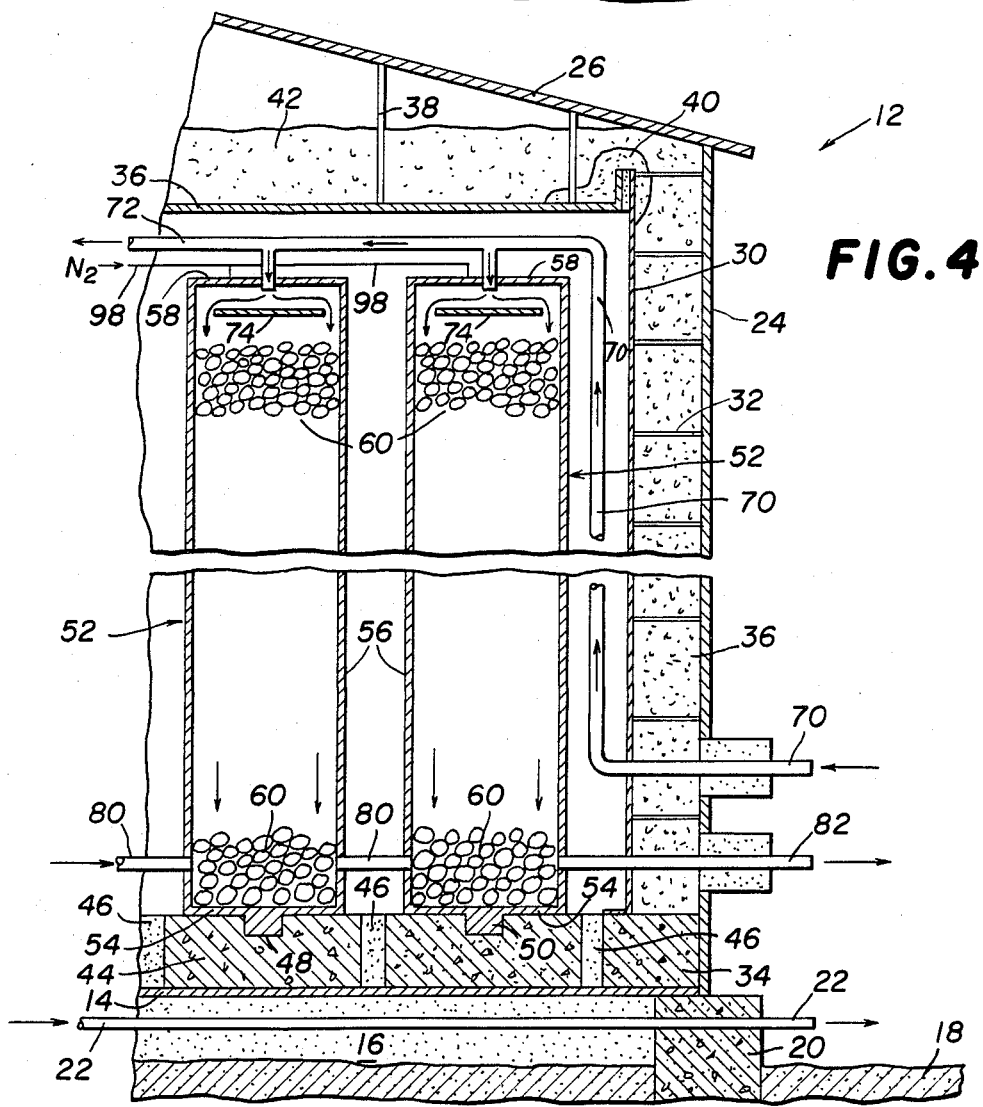
FIG. 4 is an enlarged view of one side of the apparatus shown in FIG. 1.

To the extent it is reasonable and practical, the same numbers will be used in the various views of the drawings to identify the same or similar elements.

The thermal energy storage apparatus includes an insulated tank 12 which has a flat metal circular bottom 14 supported on thermal insulation 16 resting on earth 18. However, thermal insulation 16 can be replaced by sand if insulating concrete blocks 44 described infra are sufficiently thick to provide the required insulation. The periphery of the tank is supported on circular concrete foundation 20. A plurality of conduits 22 can be positioned in the insulation 16 beneath tank bottom 14. When necessary or desirable, a cooling fluid, desirably water, can be circulated through the conduits 22 to prevent the earth 18 from becoming excessively hot and drying out to a depth such that earth shrinkage may cause the tank to settle and fall. Of course, if the tank is based on rock rather than a soil containing water, such cooling would not be required.

The lower edge of vertical circular cylindrical tank side wall 24 is joined to the edge of tank bottom 14. Conical roof 26 is mounted on the upper edge of side wall 24 and provides the main support for the roof.

However, centrally positioned vertical column 28 provides additional support for the roof.

Internally spaced from side wall 24 is a thin gauge metal vertical circular cylindrical barrier 30 which is supported by a plurality of horizontal rods 32 extending from the barrier to the side wall 24. The lower edge of barrier 30 is supported on an insulating concrete ring 34 located on the top surface of tank bottom 14. The annular space between the side wall 24 and the barrier 30 is filled with a granular insulating material 36, desirably perlite.

Circular deck 36 is internally suspended by rods 38 from the inside of roof 26. The peripheral edge of deck 36 is located adjacent the upper edge of barrier 30. Insulating blanket 40 is placed over the edge of deck 36 and the upper edge of barrier 30 to prevent granular insulation from falling through the space between them. Granular insulation 42, desirably perlite, is placed on top of deck 36.

A plurality of spaced apart circular blocks 44 of load bearing insulating concrete are positioned on the top of tank bottom 14. The space between blocks 44 is filled with granular insulation 46, such as perlite. Each block 44 can have a central circular depression 48 in the top into which a mating circular plate 50 fits.

Each circular block 44 supports a heat battery 52 having a flat metal circular bottom 54, a vertical circular cylindrical metal wall 56 and a flat metal circular top 58. Each battery is fully enclosed because it is undesirable for vapor from the liquid fed to the battery to condense on the tank insulation. Plate 50 is joined to the center of the outer surface of bottom 54 so as to permit it to expand and contract equally in all radial directions. This permits each battery 52 to remain axially stationary.

Each heat battery 52 is filled with solid objects such as rocks 60 or some other material which can store heat. Thus, a plurality of small metal cylindrical containers containing a solidified salt which melts when heated can also be used in the batteries 52 to store heat. Whatever material is used, space must be provided between the solid objects so that a liquid can readily flow through each battery from top to bottom.

Two conduits 70 run through opposite sides of the wall of the tank 12 and extend to above the top of batteries 52. Conduits 70 then branch into a plurality of conduit arms 72 which communicate with the top center of the batteries 52. A liquid is supplied to the batteries individually or simultaneously by means of conduits 70 and 72. Each battery can be provided with a baffle 74 in the upper part to facilitate uniform distribution of the liquid as it flows down through rocks 60.

Liquid withdrawal branch conduits 80 communicate with the bottom interior of each battery 52. The branch conduits 80 in turn communicate with two main liquid withdrawal conduits 82, each of which extends out through opposing sides of the tank wall.

It is desirable for the tank 12 to contain an inert atmosphere if the liquid fed to batteries 52 is flammable. An inlet conduit 90 (FIG. 1) is accordingly provided in the tank wall for feeding an inert gas, such as nitrogen, to the tank interior. For the same reason, it is desirable for each battery to contain an internal blanket of an inert gas, desirably nitrogen. Accordingly, a pair of inlet lines or conduits 96, which penetrate the tank wall, are provided having branch lines or conduits 98 which communicate with the upper part of each battery 52 so as to provide an inert gas thereto.

The described thermal energy storage apparatus can be charged by feeding a previously heated stream of oil to conduit 70 which delivers it to branches 72. The hot oil is fed from branches 72 into each battery 52 simultaneously, consecutively or in any other suitable order at a trickle rate such that the batteries are never full or flooded with oil. Filling the batteries with oil is undesirable because that is unnecessary and would use much more oil with an increase in capital investment. The use of less oil is also a safety feature. As the hot oil runs down over the surface of the rocks 60, it collects in the bottom of each battery 52. The now-cooled oil is then withdrawn by branch conduits 80 and conduit 82, reheated and returned or recycled to conduit 70.

As the hot oil flows downwardly over the surface of the rocks, it will first heat the top layer of the rocks. A vertical temperature gradient, including a thermocline, will develop in each module. The thermocline will involve a heat transfer zone above which are hot rocks and below which are cold rocks. The heat transfer zone will gradually move vertically downwardly as the heat from the hot oil is stored in the heat battery. Removal of heat from the oil cools it. Accordingly, cold oil flows downwardly below the thermocline. The cold oil is removed from the bottom of the battery. When the heat zone reaches the bottom of the battery, it is fully charged with heat.

To remove heat, cold oil is trickle fed simultaneously or consecutively into the top of one or more of the batteries. As the cold oil flows downwardly over the bed of hot rocks, the oil is heated. A vertical temperature gradient, including a downwardly moving thermocline heat transfer zone, develops in which the cold oil is located above the zone and hot oil is located below the zone. The hot oil is then collected and drained from the bottom of each battery and pumped to the location where the heat is desired.

The oil used should be of suitable quality for the range of temperatures intended. In particular, it should be a low vapor pressure, high flash oil which will not decompose over the intended operating temperature range. An oil having a vapor pressure less than atmospheric pressure at the maximum temperature in the heat storage battery is preferred. Since the oil will have a true vapor pressure much less than atmospheric, the nitrogen blanket maintains the pressure in the heat batteries at essentially atmospheric pressure.

Instead of using oil, a molten salt heat transfer medium can be used. The vapor pressure of the molten salt should be less than atmospheric pressure at the maximum temperature in the heat storage battery.

The foregoing detailed description has been given for clearness of understanding only, and no unnecessary limitations should be understood therefrom, as modifications will be obvious to those skilled in the art.

What is claimed is:

1. A thermal energy storage apparatus comprising:
   a thermally insulated tank having a bottom, side wall and roof;
   a plurality of spaced apart modular heat batteries inside the tank supported on load bearing thermal insulation on the tank bottom;
   each heat battery constituting an enclosed metal shell containing a bed of solid objects and around which objects a liquid can flow;
   conduit means to feed a hot or cold liquid from outside of the tank to the top of each bed in each battery;

conduit means to withdraw a hot or cold liquid from the bottom of each bed in each battery and deliver it to a destination outside of the tank; and means to flood the tank with an inert gas.

2. A thermal energy storage apparatus comprising:

a thermally insulated tank having a bottom, side wall and roof;

a plurality of spaced apart modular heat batteries inside the tank supported on load bearing thermal insulation on the tank bottom;

each heat battery constituting an enclosed metal shell containing a bed of solid objects and around which objects a liquid can flow;

conduit means to feed a hot or cold liquid from outside of the tank to the top of each bed in each battery;

conduit means to withdraw a hot or cold liquid from the bottom of each bed in each battery and deliver it to a destination outside of the tank; and means to supply each battery with a blanket of an inert gas.

3. A thermal energy storage apparatus comprising:

a thermally insulated tank having a bottom, side wall and roof;

the side wall thermal insulation comprising a layer of granular insulation supported between the side wall and a thin gauge metal barrier which is suspended from the side wall by a plurality of horizontal rods and the bottom insulation comprising concrete load bearing insulation;

a plurality of spaced apart modular heat batteries inside the tank supported on load bearing thermal insulation on the tank bottom;

each heat battery constituting an enclosed metal shell containing a bed of solid objects and around which objects a liquid can flow;

conduit means to feed a hot or cold liquid from outside of the tank to the top of each bed in each battery; and conduit means to withdraw a hot or cold liquid from the bottom of each bed in each battery and deliver it to a destination outside of the tank.

4. A thermal energy storage apparatus according to claim 3 in which the granular insulation is expanded perlite.

* * * * *

UNITED STATES PATENT AND TRADEMARK OFFICE
CERTIFICATE OF CORRECTION

PATENT NO. : 4,524,756
DATED : June 25, 1985
INVENTOR(S) : ROYCE JAY LAVERMAN

It is certified that error appears in the above-identified patent and that said Letters Patent is hereby corrected as shown below:

Column 1, line 23, change "tape" to -- type --; column 2, line 62, change "fall" to -- fail --.

Signed and Sealed this

Twenty-ninth Day of October 1985

[SEAL]

Attest:

DONALD J. QUIGG

Attesting Officer

Commissioner of Patents and
Trademarks—Designate